United States Patent
Leppard et al.

(10) Patent No.: US 9,094,195 B2
(45) Date of Patent: Jul. 28, 2015

(54) PROTECTING DE-DUPLICATION REPOSITORIES AGAINST A MALICIOUS ATTACK

(76) Inventors: Andrew Leppard, Greenacres (AU); Alan Kennington, Balwyn North (AU)

(*) Notice: Subject to any disclaimer, the term of this patent is extended or adjusted under 35 U.S.C. 154(b) by 1035 days.

(21) Appl. No.: 12/572,525

(22) Filed: Oct. 2, 2009

(65) Prior Publication Data
US 2011/0083019 A1 Apr. 7, 2011

(51) Int. Cl.
G06F 11/30 (2006.01)
G06F 12/14 (2006.01)
H04L 9/08 (2006.01)
H04L 9/00 (2006.01)
H04L 9/06 (2006.01)

(52) U.S. Cl.
CPC .............. *H04L 9/0894* (2013.01); *H04L 9/002* (2013.01); *H04L 9/0643* (2013.01); *H04L 2209/20* (2013.01)

(58) Field of Classification Search
CPC .................................................. H04L 9/0894
USPC ........................................................ 713/189
See application file for complete search history.

(56) References Cited

U.S. PATENT DOCUMENTS

| | | | |
|---|---|---|---|
| 5,990,810 A | 11/1999 | Williams | |
| 6,005,945 A * | 12/1999 | Whitehouse | 380/51 |
| 6,708,273 B1 * | 3/2004 | Ober et al. | 713/189 |
| 7,107,452 B2 * | 9/2006 | Serret-Avila et al. | 713/176 |
| 7,543,153 B2 * | 6/2009 | Wakao et al. | 713/180 |
| 7,747,584 B1 * | 6/2010 | Jernigan, IV | 707/692 |
| 7,783,604 B1 * | 8/2010 | Yueh | 707/640 |
| 7,991,155 B2 * | 8/2011 | Fujioka et al. | 380/201 |
| 8,000,493 B2 * | 8/2011 | Chen | 382/100 |
| 8,006,090 B2 * | 8/2011 | Smith | 713/168 |

OTHER PUBLICATIONS

"DXi-Series Disk Backup Systems with Data De-Duplication: Providing Comprehensive Data and System Integrity", *Quantum Technical Brief*, www.quantum.com, 2007.

* cited by examiner

*Primary Examiner* — Dant Shaifer Harriman

(57) ABSTRACT

Methods and systems for protecting de-duplication repositories against a malicious attack are disclosed. One method receives at least one block of data to store in a data storage system. A de-duplication engine comprising a secret key is utilized to generate a secret key hash of the at least one block of data. A comparison of the secret key hash of the at least one block of data with a secret key hash table of previously stored data on the data storage system to identify duplicated data, the secret key hash comparing protecting the data storage system against a malicious attack.

3 Claims, 5 Drawing Sheets

400

```
┌─────────────────────────────────────────────────────┐
│  RECEIVES AT LEAST ONE BLOCK OF DATA TO STORE IN A  │
│                 DATA STORAGE SYSTEM.                │
│                         405                         │
└─────────────────────────────────────────────────────┘
                           │
                           ▼
┌─────────────────────────────────────────────────────┐
│ UTILIZES A DE-DUPLICATION ENGINE COMPRISING A SECRET│
│  KEY TO GENERATE A SECRET KEY HASH OF THE AT LEAST  │
│                   ONE BLOCK OF DATA.                │
│                         410                         │
└─────────────────────────────────────────────────────┘
                           │
                           ▼
┌─────────────────────────────────────────────────────┐
│ COMPARES THE SECRET KEY HASH OF THE AT LEAST ONE    │
│ BLOCK OF DATA WITH A SECRET KEY HASH TABLE OF       │
│ PREVIOUSLY STORED DATA ON THE DATA STORAGE SYSTEM   │
│ TO IDENTIFY DUPLICATED DATA, THE SECRET KEY HASH    │
│ COMPARING PROTECTING THE DATA STORAGE SYSTEM        │
│ AGAINST A MALICIOUS ATTACK.                         │
│                         415                         │
└─────────────────────────────────────────────────────┘
```

PROTECTING DE-DUPLICATION REPOSITORIES AGAINST A MALICIOUS ATTACK

BACKGROUND

Data de-duplication reduces the overall amount of data storage required to represent and retain data by identifying duplicate portions of the data and replacing those duplicate portions with pointers to existing copies of that data.

Much of the voluminous amount of information stored, communicated, and manipulated by modern computer systems is duplicated within the same or a related computer system. It is commonplace, for example, for computers to store many slightly differing versions of the same document. It is also commonplace for data transmitted during a backup operation to be almost identical to the data transmitted during the previous backup operation. Computer networks also must repeatedly carry the same or similar data in accordance with the requirements of their users.

One method for reducing the redundancy of communicated and stored data is known as data de-duplication. Basically, data de-duplication attempts to identify identical portions of data within a group of blocks of data and use this identification to increase the efficiency of systems that store and communicate data.

However, present de-duplication engines may be susceptible to an attacker attempting to modify the identification information to try to corrupt or insert malicious data into the backup archives.

For example, if an attacker knew a certain executable was going to be backed-up, they could construct their own version of the executable with a malicious pay load. If they caused their version to have the same identifying characteristics as the original version, then once the malicious version was stored, any later legitimate version would not be stored. Instead, the de-duplication engine would throw away the valid data and provide a reference to the malicious data.

BRIEF DESCRIPTION OF THE DRAWINGS

The accompanying drawings, which are incorporated in and form a part of this specification, illustrate some embodiments of the subject matter and, together with the description, serve to explain principles discussed below:

FIG. 4 illustrates a flow diagram of an example method of classifying data for de-duplication utilizing a secret key hash for protecting de-duplication repositories against a malicious attack, according to an embodiment.

Figure 1:
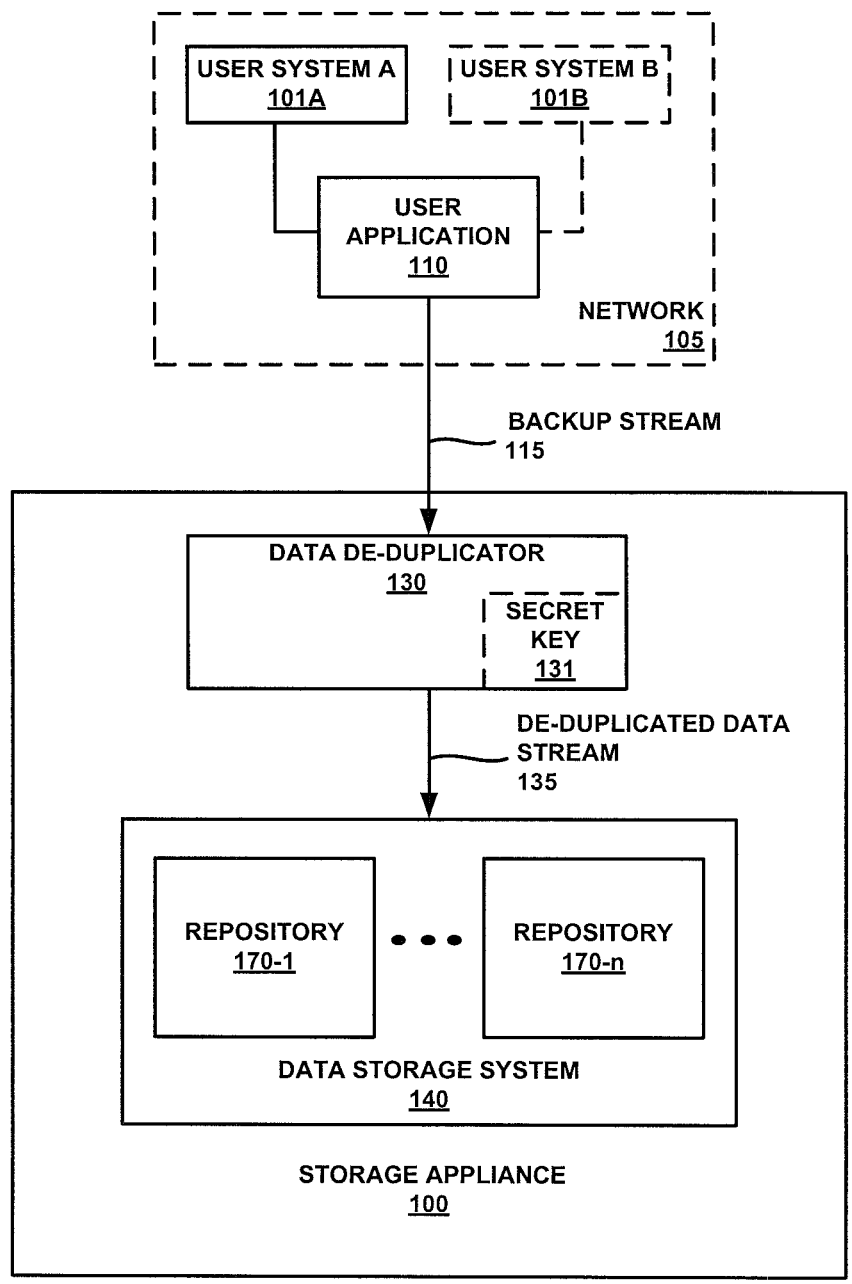
FIG. 1 is a block diagram of an example backup appliance coupled with at least one user system, in accordance with an embodiment.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail so as not to unnecessarily obscure aspects of the described embodiments.

Notation and Nomenclature

Unless specifically stated otherwise as apparent from the following discussions, it is appreciated that throughout the description of embodiments, discussions utilizing terms such as "accessing," "classifying," "receiving," "walking," "assigning," "associating," "storing," "processing," "retrieving," "de-duplicating," "outputting," "varying," or the like, refer to the actions and processes of a computer system, microcontroller, processor, or similar electronic computing device. The computer system, microcontroller, processor, or similar electronic computing device manipulates and transforms data represented as physical (electronic) quantities within the computer system's/microcontroller's/processor's/similar electronic computing device's registers and memories into other data similarly represented as physical quantities within the memories or registers. In some embodiments such a computer system, microcontroller, processor, or similar electronic computing device is included within, coupled with, or takes the form of a data storage system, a server, or both.

The term block and sub-block both refer, without limitation, to finite blocks or infinite blocks (sometimes called streams) of zero or more bits or bytes of digital data. Although the two different terms ("blocks" and "sub-block") essentially describe the same substance (digital data), the two different terms have been employed in this specification to indicate the role that a particular piece of data is playing. The term "block" is usually used to refer to raw data to be manipulated. The term "sub-block" is usually used to refer to a part of a block. "Blocks" are "partitioned" into "sub-blocks". The term partition has its usual meaning of exhaustively dividing an entity into mutually exclusive parts. However, within this specification, the term also includes cases where: not all of the block is subdivided; multiple overlapping sub-blocks are formed; a natural number is a non-negative integer (0, 1, 2, 3, 4, 5 . . . ). Where the phrase "zero or more" is used, this phrase is intended to encompass the degenerate case where the objects being enumerated are not considered at all, as well as the case where zero or more objects are used.

Overview

Herein, systems and methods are described for data de-duplication utilizing matching blocks based on the hash of the block data combined with a secret key. However, the secret key is not made available to every user whose data is being backed up. By limiting or denying access to the secret key, it becomes much more difficult for a user to generate two blocks with the same hash. For example, in a corporate environment there might be thousands or more users whose data is being backed up into a de-duplication repository. In one embodiment, the backups would be controlled by a specific source such as a separate IT department or the like. As such, the secret key utilized during the hash of the backups would only be available to the separate IT department or the like.

Thus, even if an attacker knew a user was going to back-up a certain executable, knew the setup of the repository it was going to be stored in, and knew how the data was sorted, without knowing the secret key that was used for the block identifying secret key hash, the attacker could not construct a version of the executable with a malicious pay load that would have a matching identifier. In other words, they would not be able to duplicate the block of data's secret key hash identifier without knowing the secret key. The secret key may be a password, a padding sequence, or the like.

Furthermore, in another embodiment, two or more secret keys may be utilized. For example, a first hash may be performed on the block of data appended with a first secret key. The resultant data may then be appended with a second secret key and a second hash may be performed. The process could be repeated any number of times thereby allowing the use of any number of secret keys.

In one embodiment, the present technology may utilize a Hash Message Authentication Code (HMAC). In general, HMAC is a type of message authentication code (MAC) calculated using a specific algorithm involving a cryptographic hash function in combination with a secret key. For example, it may be used to simultaneously verify both the data integrity and the authenticity of a message.

Discussion will begin with description of an example storage system that de-duplicates one or more electronic data files. Operation of the storage systems will then be described in greater detail in conjunction with description of an example method of storing data in a data storage system in accordance with a secret key data de-duplication policy.

Operation

FIG. 1 is a block diagram of an example storage appliance 100, in accordance with an embodiment of the subject matter described herein. In one embodiment, storage appliance 100 is coupled with a user application 110, which may be an independent software vendor (ISV) backup application coupled with a single computer system (e.g., user system 101A), multiple computer systems (e.g., user system A (101A), user system B (101B), etc.), or a network 105 (which may include one or more computer systems or a central storage system).

For example, storage appliance 100 may be a tapeless backup target which presents one or more interfaces to an ISV backup application, such as user application 110. Such as a virtual tape library (VTL), which user application 110 sees as a virtual tape library. In one embodiment, the VTL interface accepts data formatted in accordance with tape library specifications. Another example of an interface, which is presented in some embodiments, is that of a network attached storage for storing and sharing files among entities coupled with a network 105. It is appreciated that, in some embodiments, storage appliance 100 may present as additional or alternative interfaces as well. In one embodiment, storage appliance 100 is a DXi-series storage appliance produced by Quantum® Corporation of San Jose, Calif.

Consider an example, where a storage appliance 100 is being utilized by user application 110 as a backup appliance. Storage appliance 100 receives a backup stream generated by an ISV backup application (user application 110). Some examples of ISV backup applications include: Commvault Galaxy®, Veritas NetBackup by Symantec™, and Networker by EMC². Typical ISV backup applications, of which there are many examples, configure a user's computer system and/or network to interact with a storage appliance for storing data. In one example, a backup stream 115 is generated by the ISV backup application from user data on a computer or a network.

Generally it is the job of this ISV backup application to package up whatever data it is supposed to be backing up and to push it in this packaged form (e.g., backup stream 115) into storage appliance 100 in a specific format utilized by the ISV backup application. This format allows the ISV backup application to retrieve and reassemble the backed up data at some future time.

With reference still to FIG. 1, in one embodiment, storage appliance 100 comprises a data de-duplicator 130, and a data storage system 140, which are coupled to one another to exchange information during the operation of storage appliance 100.

In general, data de-duplicator 130 is coupled with storage devices 140 and operates to de-duplicate a received data backup stream 115 prior to storing the de-duplicated information from the data stream on storage devices 140. In one embodiment, data de-duplicator 130 parses through backup stream 115 to partition backup stream 115 into data segments called sub-blocks upon which a de-duplication process can be performed. The de-duplication process, performed by data de-duplicator 130, identifies duplicate data in a file, a data stream, or in a file system that is being stored or backed up to a data storage system 140.

Typically, a first instance of a data block (e.g., a file or sub-block of data, depending on the de-duplication methodology employed) is placed in a repository as a reference copy of that data range. Depending on the de-duplication process employed, duplications of reference data ranges are searched for in various forms, such as duplicated blocks/sub-blocks of data in a stream, duplicated sub-blocks of data in a file, or even duplicates of an entire file, to name a few.

When a duplicated range of data is found in data being stored, a de-duplicator replaces the identified duplicate data range with a smaller reference such as a pointer, code, dictionary count, or the like, that references a copy of the data range, pointer to a copy of the data range, or the like stored in a de-duplication repository. In the case of a data stream, the de-duplicated data stream 135 is then stored. In the case of a file, the reference can be stored instead of storing the file. In this manner, de-duplication typically allows more data to be stored in a fixed size data storage system 140 than would otherwise be possible. When data is retrieved from de-duplicated storage, the de-duplication process is reversed to reassemble the data by substituting the stored reference copy of a data range for any reference to that data range. Further description of one embodiment of data de-duplication is provided at FIG. 2.

With reference still to FIG. 1, in one embodiment, data storage system 140 includes at least one repository 170 utilized for storing processed information output from data de-duplicator 130 for a single de-duplication methodology. For example, repository 170 may include a repository and/or any other storage required for a de-duplication methodology. In another embodiment, data storage system 140 may include a number of repositories 170-1 through 170-$n$ separately storing output from data de-duplicator 130. In one embodiment, the number of repositories (170-1 to 170-$n$) is dependent upon the number of different data de-duplication storage methodologies employed within data de-duplicator 130. For example, repository 170-1 may include de-duplicated data that was de-duplicated without the utilization of the secret key, while repository 170-n would include de-duplicated data that included the secret key during.

For example, in a new or updated de-duplication system utilizing only HMAC, there may be only one repository 170. However, in previously existing de-duplication data storage systems 140, there may be a first repository 170-1 for de-duplicated data that was hashed without (e.g., before) a secret key and a second repository 170-n for de-duplicated data that was hashed with the secret key. Further description of an embodiment of secret key data de-duplication in conjunction with a pre-existing repository or a repository utilizing more than one secret key hash is provided at FIG. 3.

Figure 2:
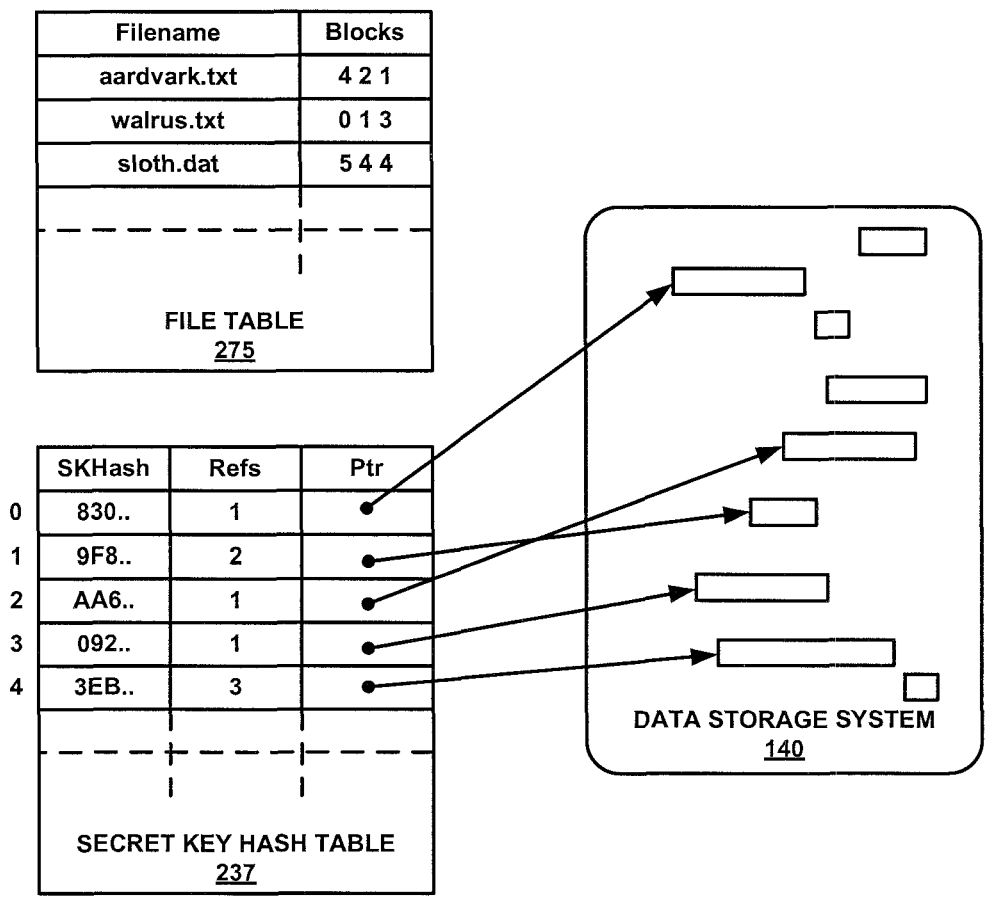
FIG. 2 is a block diagram of an example of a de-duplication file system utilizing a secret key hash, according to an embodiment.

With reference now to FIG. 2, an example of a de-duplication file system that attempts to avoid storing different instances of the same data more than once is shown according to an embodiment. In one embodiment, the bottom layer consists of a collection of unique sub-blocks of varying length that are stored somewhere on data storage system 140. The middle layer consists of a secret key hash table 237 containing one entry for each sub-block. In one embodiment, each entry consists of a secret key hash of the sub-block, a reference count for the sub-block, and a pointer to the sub-block on disk. The secret key hash table 237 is indexed by some part of the secret key hash (e.g. the top layer consists of a table of files 275 that binds the bottom 16 bits). Although a secret key hash table 237 is used in this example, many other data structures (e.g. a binary tree) could also be used to map secret key hashes to sub-block entries.

The top layer consists of a file table 275 that binds filenames to lists of sub-blocks, each list being a list of indexes into the secret key hash table 237. In general, the reference count of the secret key hash table 237 records the number of references to the sub-block that appear in the entire set of files in the file table 275. In another embodiment, the reference count is not kept in the index, but is instead kept in meta-data associated with each sub-block. The issue of hash table 275 "overflow" can be addressed using a variety of well-known overflow techniques such as that of attaching a linked list to each hash slot When a file is read, the list of hash table indexes is converted to pointers to sub-blocks of data using the secret key hash table 237. If random access to the file is required, extra information about the length of the sub-blocks could be added to the file table 275 and/or secret key hash table 237 so as to speed access.

Figure 3:
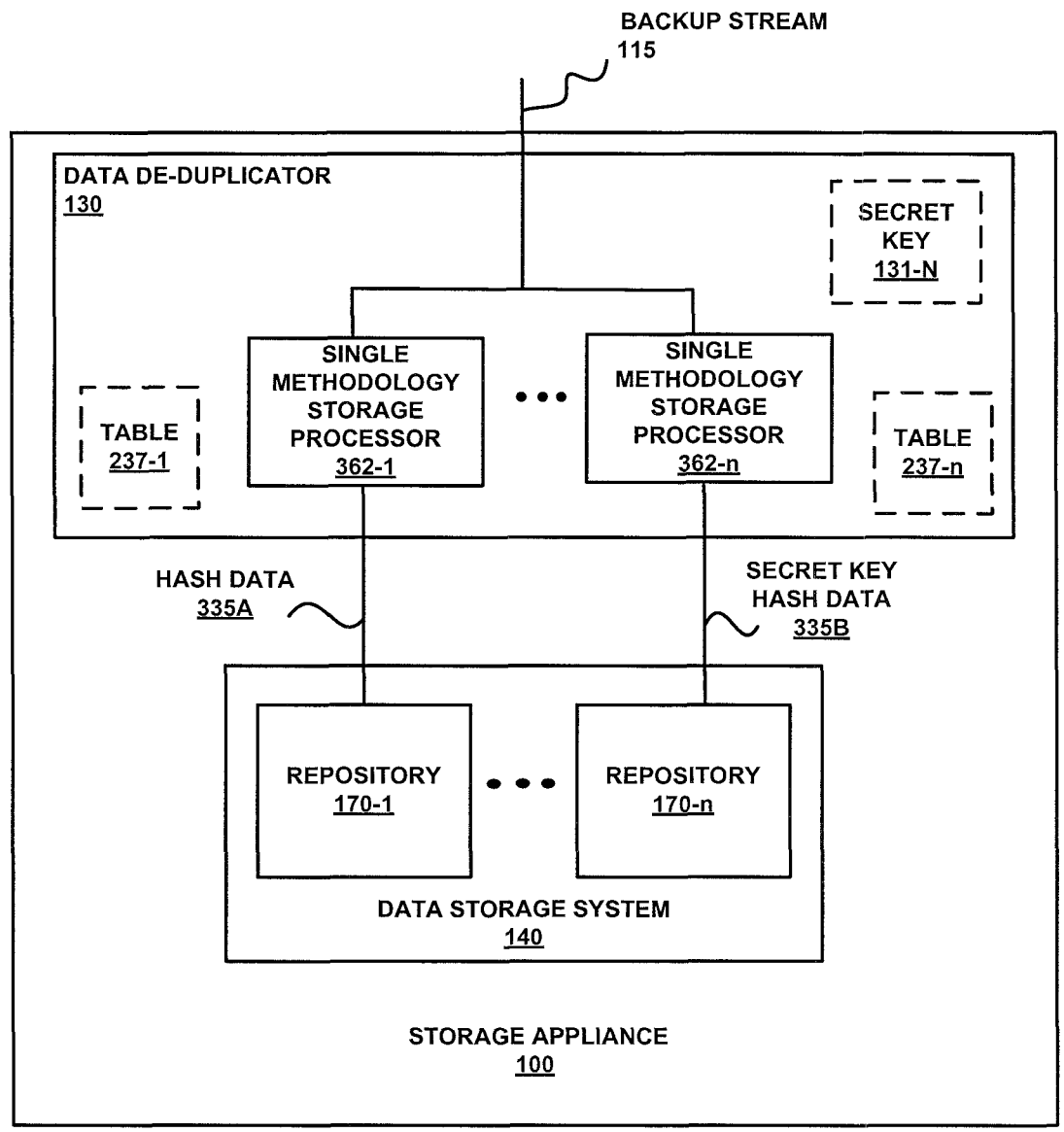
FIG. 3 is a block diagram of a multiple identification environment storage processor utilizing at least one secret key hash, according to an embodiment.

FIG. 3 is a block diagram of a data de-duplicator 130, according to one embodiment. As shown in FIG. 3, in one embodiment, data de-duplicator 130 comprises a plurality of single methodology storage processors 362-1 to 362-n. Each storage processor 362 of the plurality processes data for de-duplication in accordance with a different de-duplication methodology. Consider, for example, an embodiment where a first single methodology storage processor 362-1 processes and stores hash data 135. In general, hash data 335 refers to a non-secret key hashed data de-duplication methodology, such as for a pre-existing non-secret key de-duplication environment. In this same embodiment, a second single methodology storage processor 362-n processes and stores secret key hash data 335A in accordance with the secret key data methodology. In a similar fashion, additional storage processors 362 can be included to process data according to additional data de-duplication storage methodologies, such as using a second secret key, a plurality of secret keys, etc.

In another embodiment, data de-duplicator 130 may utilize a variable methodology storage processor to allow the secret key de-duplication methodology to be implemented in existing storage appliances 100 having pre-existing de-duplicated data without requiring the pre-existing hash data to be re-hashed with the secret key hash. Thus, by utilizing a variable methodology storage processor, data de-duplicator 130 will be able to vary its de-duplication storage methodology and/or de-duplicating parameters in order to process and store new data with pre-existing stored data. It is appreciated that in one embodiment, a data de-duplicator 130 can include one or more single methodology storage processors 362 and one or more variable methodology storage processors.

In one embodiment, as shown in FIG. 3, each single methodology storage processor 362-1 to 362-n is coupled with a single repository 170 of a plurality of repositories 170-1 to 170-n. In this manner, each repository 170 of the plurality of repositories 170-1 to 170-n is used for exclusively storing output of a de-duplication storage methodology that is employed by the single methodology storage processor 362 to which it is coupled. However, in another embodiment, any storage processor of any type may be coupled with any or all of repositories 170-1 to 170-n.

Referring still to FIG. 3, in one embodiment, there may be a single table 237-1, or there may be a plurality of tables 237-n. Additionally, there may be one or more secret keys 131-N. For example, if data de-duplicator 130 is utilizing a secret key hash methodology and all of the data stored has been hashed with the same secret key, then there only need be a single look up table 237-1. However, if the stored data includes a portion of pre-existing data that was hashed and stored prior to the utilization of the secret key hash then a plurality of look up tables 237-n may be needed. That is, one look up table 237 for each type of hash that has been performed on data within the data storage system 140. For example, a first look up table 237-1 may be needed to look up data hashed without a secret key while a second look up table 237-2 may be utilized to look up data hashed with the secret key. Similarly, if the secret key is changed, there may be a need to utilize a third look up table 237-3, etc. In another embodiment, each different hash may be stored in a single look up table 237 or additional tables 237-n may be added to maintain an upper bound on the overall size of table 237. In one embodiment, each different hash may be performed on the block of data during de-duplication.

Example Methods of Operation

Flow diagram 400 includes processes that, in various embodiments, are carried out by a processor/microcontroller under the control of computer-readable and computer-executable instructions. In some embodiments, this comprises a processor/microcontroller that is in, or used to implement one or more functions of, a storage system such as data storage appliance 100. In some embodiments, this includes a processor/microcontroller such as described in detail in computer system 500 of FIG. 5. It is appreciated that the computer-readable and computer-executable instructions for executing the method illustrated by flow diagram 400 reside, for example, in any tangible computer-readable storage media. Some examples of suitable computer-readable storage media include, but are not limited to, a compact disk read only memory (CD-ROM), a read only memory, random access memory, and magnetic storage media (e.g., a disk or a tape). In some embodiments, such computer-readable and computer-executable instructions reside on computer-readable storage media such as a ROM or firmware of a processor/microcontroller.

Although specific flows of procedures are disclosed in flow diagram 400, such flows are provided for example. That is, embodiments are well suited to performing various other procedures or variations of the procedures recited in flow diagram 400. It is appreciated that, in some embodiments, the procedures in flow diagram 400 may be performed in different orders than presented, and that not all of the procedures in flow diagram 400 may be performed in every embodiment.

With reference now to 405 of FIG. 4 and to FIG. 1, one embodiment receives at least one block of data to store in a data storage system. For example, in various embodiments, backup stream 115 comprises user application 110 information from a single computer system (e.g., 101A), multiple computer systems (e.g., 101A, 101B, etc.), or a network (e.g., network 105). It is appreciated that, in some embodiments, user data and application data from a variety of source applications may be interleaved on backup stream 115.

Referring now to 410 of FIG. 4 and to FIG. 2, one embodiment utilizes a de-duplication engine comprising a secret key to generate a secret key hash of one or more blocks of data. In general, a hash function accepts a variable-length input block of bits and generates an output block of bits that is based on the input block. Most hash functions guarantee that the output block will be of a particular length (e.g. 16 bits) and aspire to provide a random, but deterministic, mapping between the infinite set of input blocks and the finite set of output blocks. The property of randomness enables these outputs, called "hashes", to act as easily manipulated representatives of the original block.

In one embodiment, the present technology matches blocks directly based on the secret key hash of the block data, instead of matching them based on a cryptographic hash. One embodiment utilizes an HMAC which is defined as follows:

$$HMAC_K(M) = h((K \oplus opad) \| h((K \oplus ipad) \| M))$$

Where K is a secret key padded to the block size of the hash function.

Where $\oplus$ is "exclusive OR" and "$\|$" denotes concatenation or append.

Where M is the block data (or message in HMAC terminology).

Where opad is the outer padding, which may be the following sequence: 0x5c5c5c . . . 5c.

Where ipad is the inner padding, which may be the following sequence: 0x363636 . . . 36. In another embodiment, the opad and ipad may be two one-block-long hexadecimal constants.

With reference now to 415 of FIG. 4 and to FIG. 2, one embodiment compares the secret key hash of the at least one block of data with a secret key hash table 237 of previously stored data on the data storage system 140 to identify duplicated data. By utilizing the secret key hash to perform the comparing, the data stored on the data storage system 140 can be protected against malicious attack.

As described herein, in one embodiment, to more efficiently utilize de-duplication, at some stage it becomes important to be able to identify identical sub-blocks. This can be done in a variety of ways including, but not limited to, comparing the sub-blocks themselves, comparing the secret key hashes of the sub-blocks, comparing references to the sub-blocks, etc. In one embodiment, by utilizing a data structure, such as secret key hash table 237 that maintains the references to the sub-blocks, in sorted order, not only are currently identical sub-blocks identified, but secret key hash table 237 can also be used to determine quickly whether incoming sub-blocks are identical to any of those already stored.

Thus, by using a secret key, such as an HMAC, malicious attack becomes more difficult because the attacker does not know the hash of any known data stored in the repository, even if they have the plaintext, parser and hash algorithm. Further, any malicious attack would now be required to work through multiple levels of hashing with secret keys.

Example Computer System Environment

Figure 5:
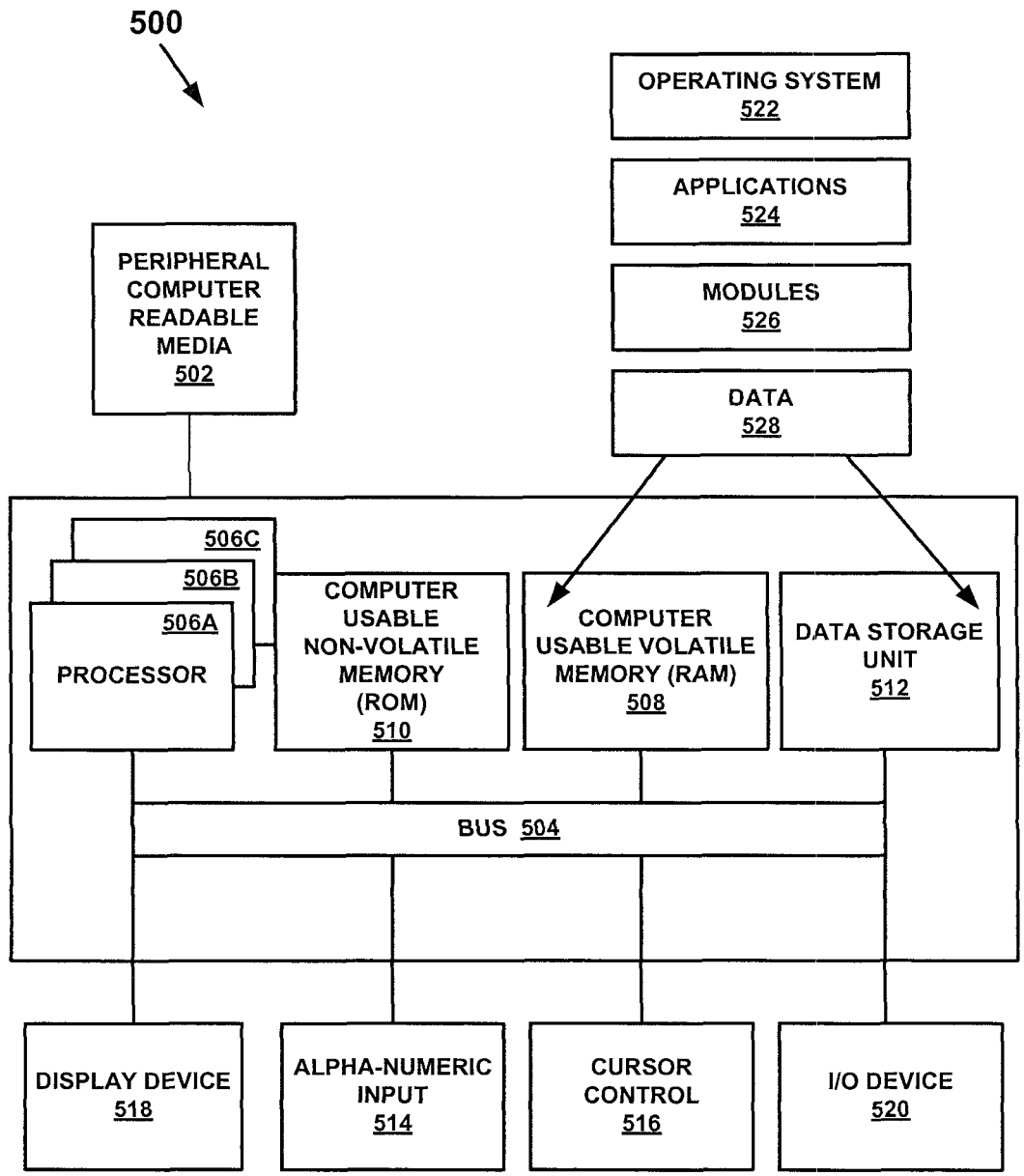
FIG. 5 is a block diagram of an example computer system, according to an embodiment, with which or upon which at least one embodiment of the present invention can be implemented.

FIG. 5 illustrates an example computer system 500, according to an embodiment, with which or upon which various embodiments of the present invention can be implemented. All or portions of some embodiments described herein are composed of computer-readable and computer-executable instructions that reside, for example, in computer-usable/computer-readable storage media of, or useable by, a computer system. That is, FIG. 5 illustrates one example of a type of computer (computer system 500) that can be used in accordance with, or to implement various embodiments, that are discussed herein. It is appreciated that computer system 500 of FIG. 5 is only an example and that embodiments as described herein can operate on or within a number of different computer systems including, but not limited to, general purpose networked computer systems, embedded computer systems, server devices, client devices, various intermediate devices/nodes, stand alone computer systems, storage systems, and the like. As shown in FIG. 5, computer system 500 of FIG. 5 is well adapted to having peripheral computer-readable storage media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C. System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. In one embodiment, system 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one, or some combination, of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable media within data storage unit 512, peripheral computer-readable storage media 502, and/or other computer-readable storage media.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A malicious-attack-preventing data de-duplication storage system comprising:
a memory that stores a secret key, where the secret key is a password or a padding sequence; and
a processor that:
produces a modified data block by appending the secret key to the end of the data block, pre-pending the secret key to the beginning of the data block, or xor-ing the data block with the secret key, where the secret key is associated with the data block;
produces a secret key hash by hashing the modified data block; and
provides the secret key hash to the de-duplication system.

2. A data de-duplication system, comprising:
a memory configured to store a secret key, where the secret key is a password or a padding sequence; and
a processor configured:
to produce a modified data block by appending the secret key to the end of a data block available to the de-duplication system, where the secret key is associated with the data block;
to produce a secret key hash by hashing the modified data block; and
to use the secret key hash as a uniqueness indicator in the data de-duplication system.

3. A data de-duplication system, comprising:
a memory configured to store a secret key, where the secret key is a password or a padding sequence; and
a processor configured:
to produce a modified data block by prepending the secret key to the beginning of a data block available to the de-duplication system, where the secret key is associated with the data block;
to produce a secret key hash by hashing the modified data block; and
to use the secret key hash as a uniqueness indicator in the data de-duplication system.

* * * * *